United States Patent
Erhart et al.

(10) Patent No.: US 8,789,136 B2
(45) Date of Patent: Jul. 22, 2014

(54) SECURING A DEVICE BASED ON ATYPICAL USER BEHAVIOR

(75) Inventors: George Erhart, Loveland, CO (US); Valentine Matula, Granville, OH (US); David Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 839 days.

(21) Appl. No.: 12/202,650

(22) Filed: Sep. 2, 2008

(65) Prior Publication Data
US 2010/0056105 A1   Mar. 4, 2010

(51) Int. Cl.
*G06F 21/00* (2013.01)
*G06F 21/62* (2013.01)
*H04W 12/06* (2009.01)
*H04W 12/12* (2009.01)

(52) U.S. Cl.
CPC .............. *G06F 21/629* (2013.01); *H04W 12/06* (2013.01); *H04W 12/12* (2013.01)
USPC ................ 726/2; 455/410; 455/411; 455/26.1

(58) Field of Classification Search
CPC ..... G06F 21/629; H04W 12/06; H04W 12/12
USPC ............................................................ 726/2
See application file for complete search history.

(56) References Cited

U.S. PATENT DOCUMENTS

| | | | |
|---|---|---|---|
| 5,533,123 A | | 7/1996 | Force et al. |
| 5,734,977 A | * | 3/1998 | Sanmugam .................... 455/410 |
| 5,913,175 A | * | 6/1999 | Pinault .......................... 455/558 |
| 7,373,137 B2 | | 5/2008 | Lauridsen et al. |
| 2003/0009693 A1 | | 1/2003 | Brock et al. |
| 2003/0065934 A1 | * | 4/2003 | Angelo et al. ................ 713/200 |
| 2003/0129964 A1 | * | 7/2003 | Kohinata et al. ............. 455/411 |
| 2004/0117651 A1 | | 6/2004 | Little et al. |
| 2004/0172535 A1 | * | 9/2004 | Jakobsson et al. ............ 713/168 |

(Continued)

FOREIGN PATENT DOCUMENTS

| | | |
|---|---|---|
| CN | 1625210 | 6/2005 |
| WO | 2004090781 | 10/2004 |
| WO | 2008041915 A2 | 4/2008 |

OTHER PUBLICATIONS

Scheuermann, D., The smartcard as a mobile security device, Oct. 2002, Electronics & Communication Engineering Journal, vol. 14, No. 5, pp. 205-210.*

(Continued)

*Primary Examiner* — Mohammad L Rahman
*Assistant Examiner* — Kenneth Chang (57) ABSTRACT

A system and method for securing the mobile device applies the rules to determine if an event associated with an application is a secure event. If the event is a secure event, the system applies the rules to determine if the event is authenticated. If the event is authenticated, the event is authorized and the system updates rule data associated with the event and/or other associated events. Updating the rule data allows other associated events to be authenticated. If the event is not authenticated, the system requests authentication from a user. If the authentication is valid, the event is authorized and the system updates the rule data associated with the event and/or other associated events. If the authentication is not valid, the system secures the mobile device. Authorizing the event enables a user to access the application and/or data associated with the application.

29 Claims, 5 Drawing Sheets

(56) References Cited

U.S. PATENT DOCUMENTS

| | | | |
|---|---|---|---|
| 2004/0192256 A1* | 9/2004 | Kuwajima | 455/411 |
| 2004/0225627 A1 | 11/2004 | Botros et al. | |
| 2006/0075263 A1 | 4/2006 | Taylor | |
| 2006/0180660 A1* | 8/2006 | Gray | 235/380 |
| 2007/0077925 A1 | 4/2007 | Hiyama | |
| 2007/0198849 A1* | 8/2007 | Mozer | 713/186 |
| 2007/0298767 A1* | 12/2007 | Brown et al. | 455/411 |
| 2008/0009264 A1 | 1/2008 | Brown et al. | |
| 2009/0251282 A1* | 10/2009 | Fitzgerald et al. | 340/5.31 |

OTHER PUBLICATIONS

Murali et al., "A Survey on Intrusion Detection Approaches," Information and Communication Technologies, 2005, ICICT 2005, First International Conference on Karachi, Pakistan, Aug. 27-28, 2005, Piscataway, New Jersey, USA, IEEE, pp. 233-240.

* cited by examiner

SECURING A DEVICE BASED ON ATYPICAL USER BEHAVIOR

TECHNICAL FIELD

The system and method relates to device security systems and in particular to security systems that monitoring user behavior in mobile devices.

BACKGROUND

As a result of their mobility, mobile communication devices are sometimes lost or stolen. As the complexity of mobile devices increases, the amount of sensitive information stored in the mobile device also increases. The result is an increasing need for protection of sensitive information stored in mobile devices.

Currently, some security systems for mobile devices require that a user report that the mobile device has been lost or stolen. Upon notification that the mobile device has been lost or stolen, an administrator can send a command to the mobile device that can lock the mobile device or wipe sensitive information from the mobile device. However, for this method to be effective, the user must report to the administrator that the mobile device has been lost or stolen before any sensitive information has been removed from the mobile device. Moreover, the mobile device must be connected to a network in order to receive the command to lock or wipe the mobile device.

Mobile device security systems such as disclosed in U.S. Patent Publication 2008/0009264 allow for a mobile device to be secured while not connected to a network based on limited predefined events such as a user locking the device, the mobile device not being in the proximity of a holster, powering down the mobile device, closing the mobile device, or the lack of communication with the network.

Other systems, such as disclosed in U.S. Pat. No. 7,373,137 allow a user to define a set of authorized call numbers. This prevents an unauthorized user from making calls to any number that is not authorized.

The problem with these systems is that they do not monitor secure events and non-secure events to provide a robust mechanism to secure a mobile device. As a result, these systems are very limited in their methods of securing a mobile device.

SUMMARY

The system and method are directed to solving these and other problems and disadvantages of the prior art. Typically, the system and method are implemented on a mobile device as a way of securing the mobile device. The system applies rules to determine if an event associated with an application is a secure event. If the event is a secure event, the system applies the rules to determine if the event is authenticated. If the event is authenticated, the event is authorized and the system updates rule data associated with the event and/or other associated events. Updating the rule data allows other associated events to be authenticated. The user can access an application and/or data associated with the application.

If the event is not authenticated, the system requests authentication from a user. If the authentication is valid, the event is authorized and the system updates the rule data associated with the event and/or other associated events. The user can access the application and/or data associated with the event. If the authentication is not valid, the system secures the mobile device.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Figure 1:
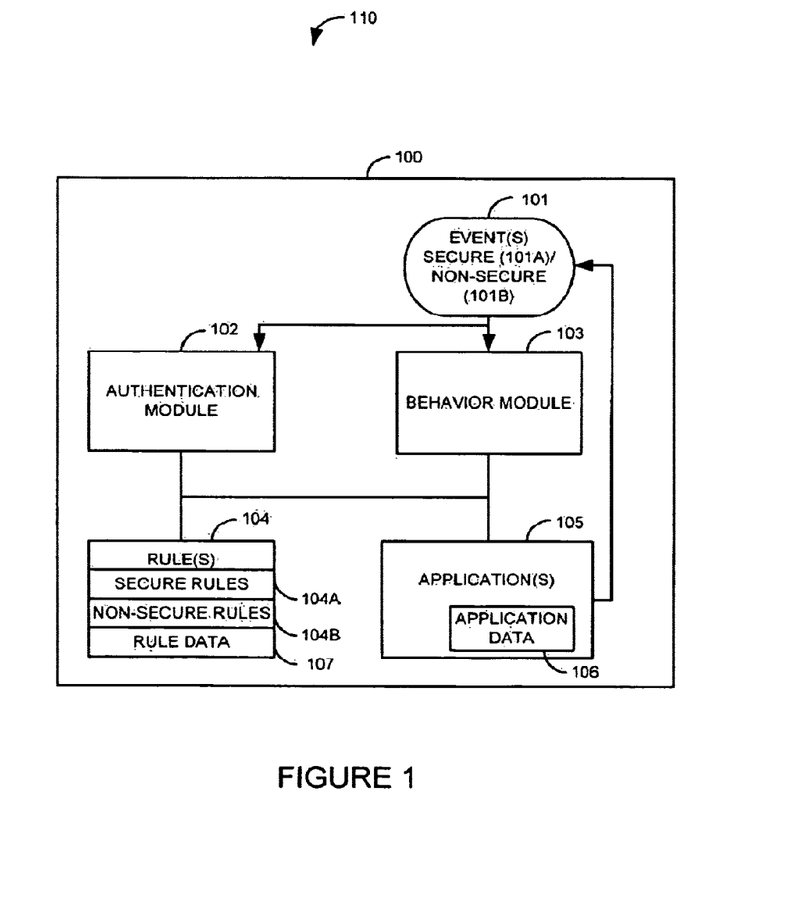
FIG. 1 is a block diagram illustrating a system for securing a device.

FIG. 1 is a block diagram illustrating a system 110 for securing a device 100. The system 110 comprises a device 100, which includes an authentication module 102, a behavior module 103, rules 104, and one or more applications 105. The applications 105 contain application data 106. The rules 104 contain secure rules 104A, non-secure rules 104B, and rule data 107. The applications 105 generate events 101.

The device 100 may be a mobile device such as a telephone, a laptop computer, a Personal Digital Assistant (PDA), or a non-mobile device such as a Personal Computer (PC). An application 105 could be any application 105 such as an operating system, an e-mail application, a calendaring application, a web browser, a contact list application, a telephony application, a Global Positioning System (GPS) application, a device docking application, a memory manager, and the like. The application data 106 is data that is associated with the application 105. For example, an operating system has associated files, directories, and disk drives that contain application data 106 that is used by the operating system. Likewise, a calendaring application has application data associated with calendar items.

An event 101 could be any event generated by an application 105 such as: accessing a network, opening the application, accessing a file, accessing a directory, accessing a memory device, inserting a device into a docking station, removing a memory device, inserting a memory device, receiving an email, sending an email, receiving a file, sending a file, copying a file, accessing a device, entering a secure location, leaving a secure location, connecting to a network, disconnecting from a network, accessing a calendar, receiving a phone call, placing a phone call, and the like. Examples of events 101 generated by an applications 105 are: opening a web browser, accessing a contact list in a telephone, inserting a laptop into a docking station, and the like. An event 101 can be a secure event 101A or a non-secure event 101B. A secure event 101A is an event 101 that requires authentication.

The rules 104 define the way events 101 are authenticated. A rule 104 may authenticate multiple events 101 based on a single event 101. There are secure rules 104A, non-secure rules 104B, and some rules 104 that apply to both secure events 101A and non-secure events 101B. Secure rules 104A are typically associated with secure events 101A. Non-secure rules 104B are typically associated with non-secure events 101B. A non-secure event 101B does not require authentication. A non-secure event 101B can become a secure event 101A based on the rules 104. A secure event 101A can become a non-secure event 101B based on the rules 104. The rules 104 also contain rule data 107. Rule data 107 has information such as, which events 101 have been authenticated, the number of times an event 101 occurred, if a user is logged on to a network, if a laptop is connected to a docking station, timer information, and the like.

The authentication module 102 applies the rules 104 in conjunction with the rule data 107 to determine if an event 101 is a secure event 101A or a non-secure event 101 B. The authentication module 102 can authenticate an event 101 with a variety of mechanisms such as a password, a biometric, an ID card, and the like. The authentication module 102 also applies the rules 104 in conjunction with the rule data 107 to determine which events 101 are authorized and which events 101 need to be authenticated. The behavior module 103 works in conjunction with the authentication module 102 to update the rule data 107, authorize events 101, determine if events 101 are static events, and secure the device 100.

When an event 101 is generated, the authentication module 102 applies the rules 104 and the rule data 107 to determine if an event 101 is a secure event 101A. If the event 101 is a non-secure event 101B, the behavior module 103 authorizes the event 101 and updates the rule data 107. The authentication module 102 then waits for another event 101.

If the event 101 is a secure event 101A, the authentication module 102 determines if the event 101 has previously been authenticated. Authentication can be accomplished in a variety of ways based on the rules 104. For example, a user may have previously entered an access code to allow calling a telephone number or an area code.

If the event 101 is authenticated, the behavior module 103 authorizes the event 101 and updates the rule data 107. If the event 101 is not authenticated, the authentication module 102 requests authentication. The authentication module 102 determines if the authentication is valid. If the authentication is valid, the behavior module 103 authorizes the event 101 and updates the rule data 107. Otherwise, if the authentication is not valid, the behavior module 103 secures the device 100. A device 100 can be secured in many ways. For example, some or all application data 106 can be deleted from the device 100. Or, applications 105 can be deleted from the device 100. Other examples include, but are not limited to encrypting application data 106 and locking the device 100.

To give an overall view of an event flow of an email system, consider the following example. Bob has a new laptop 100 that has an email application 105. The email application 105 has a set of email contact lists 106. The laptop 100 contains five rules 104: 1) a secure rule 104A that opening the email application 105 is a secure event 101A, 2) a secure rule 104A that sending emails is a secure event 101A, 3) a non-secure rule 104B that logging on and off the work network is a non-secure event 101B, 4) a rule 104 that authorizes access to all applications 105 on the laptop 100 while logged into a work network, and 5) a rule 104 that authenticates all emails sent by Bob while logged on to the work network. The fourth and fifth rules are rules 104 that associate an event 101 with other events 101. Rule four associates the event 101 of logging on to the work network with the events 101 of running applications 105 on the laptop 100. Rule five associates the event 101 of logging on to the work network with the event 101 of sending emails.

From the laptop 100, Bob attempts to log on to the work network. This generates a first event 101. The authentication module 102 applies the rules 104 in conjunction with the rule data 107 to determine that the first event 101 of logging on to the work network is a non-secure event 101B (see rule three above). The behavior module 103 authorizes Bob to login to the work network and Bob logs into the work network. The behavior module 103 updates the rule data 107 to indicate that Bob is now logged on to the work network. Next, Bob attempts to open the email application 105. This generates a second event 101. The authentication module 102 determines that opening the email application is a secure event 101A based on a secure rule 104A (see rule one above) and requires authentication. The authentication module 102 determines that since Bob is logged on to the work network, the second event 101 of opening the email application 105 is authenticated (see rule four above). The behavior module 103 authorizes the event 101 of opening the email application 105. Bob opens the email application 105. The behavior module 103 updates the rule data 107 to indicate that the email application 105 is now authenticated.

From the email application 105, Bob sends an email to Tom. This generates a third event 101. The authentication module 102 determines by applying the secure rule 104A (see rule five above) in conjunction with the rule data 107 that this is a secure event 101A. The authentication module 102 determines that since Bob is logged on to the work network, the event 101 of sending an email to Tom is authenticated (see rule five above). The behavior module 103 authorizes the event 101 of Bob sending an email to Tom. The behavior module 103 updates the rule data 107 to indicate that the event 101 of Bob sending an email to Tom is authenticated. Bob now logs off the work network. This generates a fourth event 101. The authentication module 102 applies the non secure rule 104B (see rule three above) and determines that the fourth event 101 of logging off the work network is a non-secure event 101B. The non-secure event 101B of logging off the work network is authorized by the behavior module 103. Bob logs off of the work network. The rule data 107 is updated to indicate that Bob is no longer logged on to the work network.

Bob leaves work and is working from home. Bob attempts to access the email application 105. This generates a fifth event 101. The authentication module 102 applies the secure rule 104A (see rule one above) to determine that opening the email application 105 is a secure event 101A. The authentication module 102 determines that Bob is no longer logged onto the work network by looking at the rule data 107. The authentication module 102 requests authentication from Bob because the event 101 of opening the email application 105 is not longer authenticated. The event of opening the email application 105 is not authenticated because Bob is no longer logged into the work network. Bob authenticates by entering a password. The authentication module 102 determines that the authentication is valid. Bob is authorized to use the email application 105 and the rule data 107 is updated. Bob now sends an email to Tom. This generates a sixth event 101. The authentication module 102 applies the secure rule 104A (see rule two above) and determines that the event 101 of sending an email is a secure event 101A. The authentication module 102 applies the secure rule 104A (see rule five above) and looks at the rule data to determine that the event 101 of sending an email to Tom is authenticated because Bob already sent an email to Tom while logged on to the work network.

Next, Bob tries to send an email to Sally. This generates a seventh event 101. The authentication module 102 applies the secure rule 104A (see rule two above) to determine that the event 101 of sending an email is a secure event 101A. The authentication module 102 applies the secure rule 104A (see rule five above) to determine that the event 101 of sending an email to Sally is not authenticated because Bob never emailed Sally while logged on to the work network. The authentication module 102 now requests Bob to authenticate sending an email to Sally.

In a second example, assume that Bob's laptop 100 was stolen after Bob logged off the work network. The thief attempts to open the email application 105. This generates an event 101. The authentication module 102 applies the secure rules 104A (see rule one above) and determines that authentication is required. The authentication module 102 requests authentication from the thief because the thief is not logged on to the work network. If the authentication is not valid, the behavior module 103 secures the laptop 100.

Figure 2:
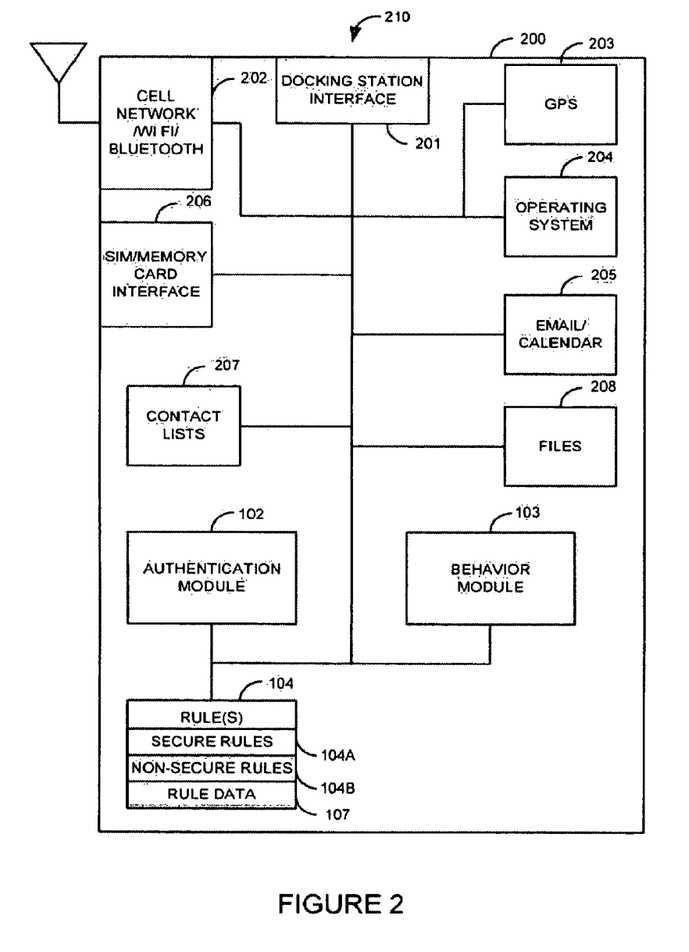
FIG. 2 is a block diagram illustrating a system for securing a mobile device.

FIG. 2 is a block diagram illustrating a system 210 for securing a mobile device. The system 210 comprises a device 200, which includes an authentication module 102, and a behavior module 103. The system 210 includes rules 104, which further include secure rules 104A, non-secure rules 104B, and rule data 107. The system 210 includes the following applications 105: a docking station interface application 201, a cell network/Wi-Fi/Bluetooth application 202, a GPS application 203, an operating system 204, a SIM/memory card interface application 206, and an email/calendar application 205. The system 210 includes application data 106 associated with applications 105. The contact lists 207 are associated with the email/calendar application 205. The files 208 are associated with the operating system 208 and possibly other applications such as the GPS application 203.

Each of the applications 201-206 can generate one or more events 101. When an event 101 is generated, the authentication module 102 applies the rules 104 in conjunction with the rule data 107 to determine if the event 101 is a secure event 101A. If the event 101 is a non-secure event 101B, the event 101 is authorized, the rule data 107 is updated, and the authentication module 102 waits for another event 101.

If the event 101 is a secure event 101A, the authentication module 102 applies the rules 104 in conjunction with the rule data 107 and determines if the event 101 is authenticated. If the event 101 is authenticated, the behavior module 103 authorizes the event and updates the rule data 107.

If the event 101 is not authenticated, the authentication module 102 requests authentication. The authentication module 102 determines if the authentication is valid (e.g., after three failed authentication attempts). If the authentication is valid, the behavior module 103 authorizes the event 101 and updates the rule data 107. Otherwise, if the authentication is not valid, the behavior module 103 secures the device 100 by locking it, or by deleting and/or encrypting the data 207, 208.

Figure 3:
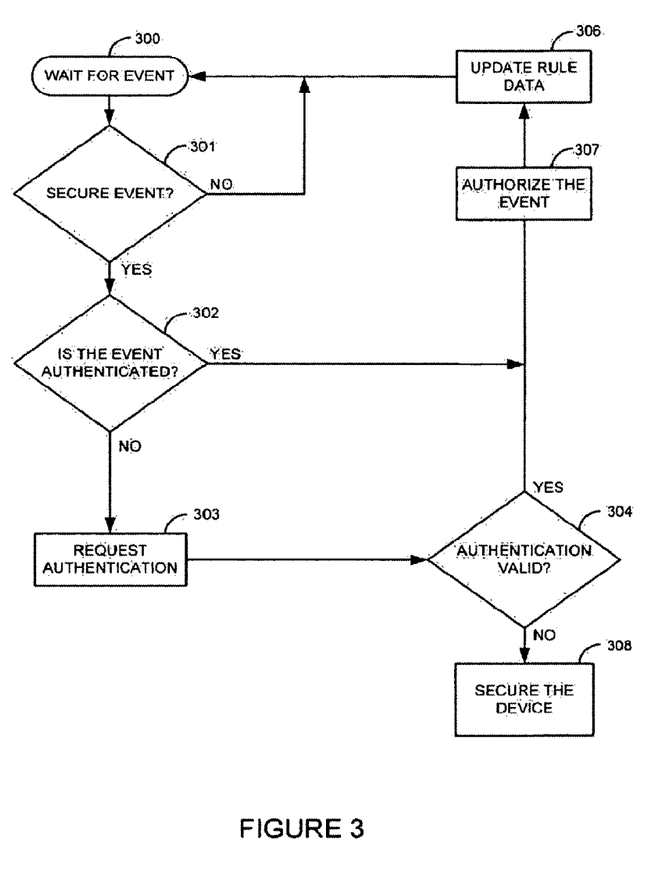
FIG. 3 is a flow diagram illustrating a method for securing a device.

FIG. 3 is a flow diagram illustrating a method for securing a device 100. Illustratively, authentication module 102 and behavior module 103 are implemented as a stored-program-controlled entity, such as a computer, which performs the method of FIGS. 3-5 by executing a program stored in a storage medium, such as a memory or disk. The process waits 300 for an event 101 to be generated. After an event 101 is generated, the process applies the rules 104 in conjunction with the rule data 107 to determine 301 if the event 101 is a secure event 101A. If the event 101 is a non-secure event 101B, the process waits 300 for the next event 101.

If the process determines 301 that the event 101 is a secure event 101A, the process applies the rules 104 in conjunction with the rule data 107 to determine 302 if the event 101 is authenticated. If the event 101 is authenticated, the process authorizes 307 the event 101, updates 306 the rule data 107, and waits 300 for the next event 101. If the event 101 is not authenticated, the process requests 303 authentication. Requesting 303 authentication could be displaying a login prompt to a user, sending a message, and the like. After receiving an authentication from a user, the process determines 304 if the authentication is valid. If the authentication is not valid, the process secures 308 the device 100. If the authentication is determined 304 to be valid, the process authorizes 307 the event 101, updates 306 the rule data 107, and waits 300 for the next event 101.

Figure 4:
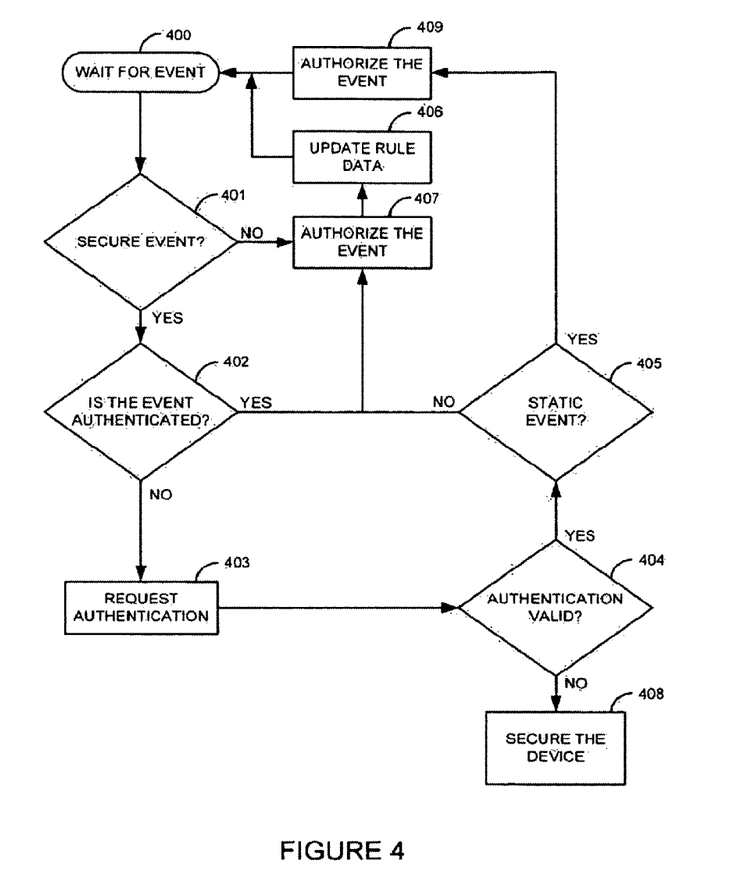
FIG. 4 is a flow diagram illustrating a method for securing a device.

FIG. 4 is a flow diagram illustrating an alternative method for securing a device 100. The process waits 400 for an event 101 to be generated. After an event 101 is generated, the process applies the rules 104 in conjunction with the rule data 107 to determine 401 if the event 101 is a secure event 101A. If the event 101 is a non-secure event 101B, the process authorizes 407 the event 101, updates 406 the rule data 107, and waits 400 for the next event 101.

If the process determines 401 that the event 101 is a secure event 101A, the process applies the rules 104 in conjunction with the rule data 107 to determine 402 if the event 101 is authenticated. If the event 101 is authenticated, the process authorizes 407 the event 101, updates 406 rule data 107, and waits 400 for the next event 101. If the event 101 is not authenticated, the process requests 403 authentication. After receiving an authentication from a user, the process determines 404 if the authentication is valid. If the authentication is not valid, the process secures 408 the device 100.

If the authentication is determined 404 to be valid, the process determines 405 if the event 101 is a static event. A static event is an event 101 that is does not use rule data 107. For example, a secure event 101A that always requires authentication regardless of any state of the device 100 or events 101 would be considered a static event (e.g., always requiring a login to a laptop regardles of any other events 101). If the event 101 is not a static event, the process authorizes 407 the event 101, updates 406 the rule data 107, and waits 400 for the next event 101. Otherwise, the process authorizes 409 the event 101.

Figure 5:
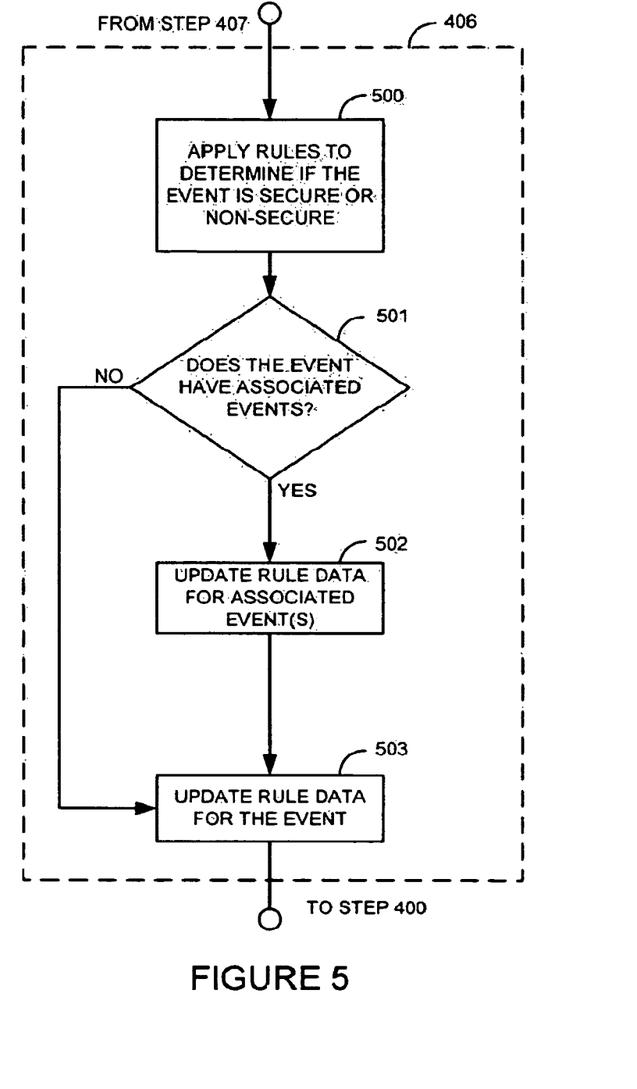
FIG. 5 is a flow diagram illustrating a method for determining if events are secure events or non-secure events and for associating events.

FIG. 5 is a flow diagram illustrating a method for determining if events 101 are secure events 101A or non-secure events 101B and for associating events 101 with other events. FIG. 5 is more detailed view of step 406 in FIG. 4. The process applies the rules 104 in conjunction with the rule data 107 to determine 500 if the event 101 is a secure event 101A or a non-secure event 101B. A secure event 101A requires authentication and a non-secure event 101B does not require authentication. A non-secure event 101B may be converted to a secure event based 101A on the rules 104 and rule data 107. Likewise, a secure event 101A may be converted to a non-secure event 101B based on the rules 104 and rule data 107.

The process determines 501 if the event 101 has any associated events. If the event 101 does not have other associated events, the process updates 503 the rule data 107 for the event 101. If the event 101 has other associated events, the process updates 502 the rule data 107 for the associated events and updates 503 the rule data 107 for the event 101.

There are many ways that a non-secure event 101B can be converted to a secure event 101A or a secure event 101A can be converted to a non-secure event 101B. For example, an event 101 may start out as a non-secure event 101. A rule 104 for the event 101 states that if the contact lists for telephone calls are accessed more than ten times within a one hour period, then the non-secure event 101B of accessing the contact list will become a secure event 101A. The user would have to re-authenticate the next time the user tried to access the contact list for telephone calls. The event 101 of accessing the contact lists could return to a non-secure event 101B after the user re-authenticates if the rules 104 so dictate.

Of course, various changes and modifications to the illustrative embodiment described above will be apparent to those skilled in the art. For example, the evaluation of security events may take place on the device and/or in the network. The physical connectivity could be a wireless connection, a USB connection, or hardwired network devices. Events from any new type of I/O device could be monitored such as: web enabled phones accessing new or sufficiently different web sites or content (e.g. foreign language sites, different search engines, and the like), sending pictures where pictures have never been sent before, and/or linking to a new Bluetooth device. In addition, events could be monitored during the boot up process of a device. Other events such as location in conjunction with other events could be used. Other examples could be where the first round of authentication is good and a thief tries to access a bank account over the phone and repeated attempts fail. In this case the primary authentication method would be invoked and/or the device could be locked. Another example could be using a GPS phone in conjunction with an interferometer to detect a person's walking verses a usual walking pattern. These changes and modifications can be made without departing from the spirit and the scope of the system and method and without diminishing its attendant advantages. It is therefore intended that such changes and modifications be covered by the following claims except insofar as limited by the prior art.

What is claimed is:

1. A system for securing a device comprising:
   a. a behavior module for authorizing events, updating rule data, and securing the device; and
   b. an authentication module responsive to a first event being a secure event, for determining if the first event is authenticated;
   c. responsive to the first event being authenticated, for directing the behavior module to authorize the first event and to update the rule data;
   d. responsive to the first event not being authenticated, for determining if an authentication is valid;
   e. responsive to the authentication being valid, for directing the behavior module to authorize the first event and update the rule data;
   f. responsive to the authentication not being valid, for directing the behavior module to secure the device;
   g. a processor;
   h. a memory storing the behavior module and the authentication module for execution by the processor;
   i. wherein the authentication module is responsive to the first event not being a secure event, for directing the behavior module to authorize the first event and update the rule data, wherein secure events require authentication and non-secure events do not require authentication, and
   j. wherein the authentication module is responsive to the first event authentication being valid, for directing the behavior module to determine if the first event is a static event, and wherein the behavior module is responsive to the first event not being a static event, for authorizing the first event and updating the rule data, the rule data comprising at least one item from the group of: which events have been authenticated, a number of times an event occurred, if a user is connected to a docking station, and timer information.

2. The system of claim 1, wherein the first event is a non-secure event, and wherein the behavior module is further adapted to update the rule data by converting the first event into a secure event.

3. The system of claim 2, wherein the behavior module is adapted to convert the first event into the secure event responsive to the behavior module authorizing a plurality of non-secure events.

4. The system of claim 1, wherein the first event is a secure event, and wherein the behavior module is further adapted for converting the first event into a non-secure event.

5. The system of claim 1, wherein the authentication module is adapted to determine if the authentication is valid based on a prior authentication of the first event.

6. The system of claim 1, wherein the authentication module is adapted to determine if the authentication is valid based on a prior authentication of an associated event.

7. The system of claim 6, wherein the first event and/or the associated event are based on activities of a person.

8. The system of claim 1, wherein the behavior module is adapted to update the rule data for the first event by updating rule data of an associated event.

9. The system of claim 8, wherein the first event and/or the associated event are based on activities of a person.

10. The system of claim 1, wherein the authentication module is adapted to determine if the authentication is valid based on a period of time since the last authentication of the first event.

11. The system of claim 1, wherein the first event is an item from the group comprising: accessing a network, accessing an application, accessing a file, accessing a directory, accessing a memory device, accessing a docking station, removing a memory device, inserting a memory device, receiving an email, sending an email, receiving a file, sending a file, copying a file, accessing a device, entering a secure location, leaving a secure location, connecting to a network, disconnecting from a network, accessing a calendar, receiving a phone call, and placing a phone call.

12. The system of claim 1, wherein the behavior module is adapted to secure the device by at least one item selected from the group comprising:
    locking the device, encrypting application data, and deleting application data.

13. The system of claim 1, wherein the device is a mobile device.

14. A method for securing a device comprising:
    a. determining if a first event is a secure event;
    b. in response to determining that the first event is a secure event, determining if the first event is authenticated;
    c. in response to determining that the first event is authenticated, proceeding to step (f);
    d. in response to determining that the first event is not authenticated, determining if an authentication is valid;
    e. in response to determining that the authentication is valid proceeding to step (f);
    f. authorizing the first event and updating rule data for the first event; and
    g. in response to determining that the authentication is not valid, securing the device, wherein securing the device comprises at least one item selected from the group comprising: locking the device, encrypting application data, and deleting application data;
    h. in response to determining that the first event is not a secure event, proceeding to step (f), wherein secure events require authentication and non-secure events do not require authentication, and wherein the rule data comprises at least one item from the group of: which events have been authenticated, a number of times an event occurred, if a user is connected to a docking station, and timer information;
    i. determining if the first event is a static event, and responsive to the first event not being a static event, authorizing the first event and updating the rule data.

15. The method of claim 14, wherein the first event is a non-secure event and wherein updating the rule data for the first event further comprises converting the first event to a secure event.

16. The method of claim 15, wherein converting the first event to the secure event is based on accessing a plurality of non-secure events.

17. The method of claim 14, wherein the first event is a secure event and wherein updating the rule data further comprises converting the first event into a non-secure event, the rule data comprising at least one item from the group of: which events have been authenticated, a number of times an event occurred, if a user is connected to a docking station, and timer information.

18. The method of claim 14, wherein the step of determining if the authentication is valid, further comprises determining if the first event is a static event, and in response to the first event not being a static event, proceeding to step (f).

19. The method of claim 14, wherein determining if the authentication is valid is based on a prior authentication of the first event.

20. The method of claim 14, wherein determining if the authentication is valid is based on a prior authentication of an associated event.

21. The method of claim 20, wherein the first event and/or the associated event are based on activities of a person.

22. The method of claim 14, wherein updating the rules for the first event further comprises updating rules of an associated event.

23. The method of claim 22, wherein the first event and/or the associated event are based on activities of a person.

24. The method of claim 14, wherein determining if the authentication is valid is based on a period of time since the last authentication of the first event.

25. The method of claim 14, wherein the first event is an item from the group comprising: accessing a network, accessing an application, accessing a file, accessing a directory, accessing a memory device, accessing a docking station, removing a memory device, inserting a memory device, receiving an email, sending an email, receiving a file, sending a file, copying a file, accessing a device, entering a secure location, leaving a secure location, connecting to a network, disconnecting from a network, accessing a calendar, receiving a phone call, and placing a phone call.

26. The method of claim 14, wherein securing the device comprises at least one item selected from the group comprising: locking the device, encrypting application data, and deleting application data.

27. The method of claim 14, wherein the device is a mobile device.

28. An apparatus for performing the method of one of claims 14 or 15-27.

29. A system for securing a device comprising:
 a. an authentication module responsive to a first event being a secure event, for determining if the first event is authenticated;
 b. responsive to the first event not being a secure event, for directing a behavior module to authorize the first event and to update rule data, wherein secure events require authentication and non-secure events do not require authentication, and wherein the rule data comprises at least one item from the group of: which events have been authenticated, a number of times an event occurred, if a user is connected to a docking station, and timer information;
 c. responsive to the first event being authenticated, for directing the behavior module to authorize the first event and to update the rule data;
 d. responsive to the first event not being authenticated, for determining if an authentication is valid;
 e. responsive to the authentication not being valid, for directing the behavior module to secure the device;
 f. responsive to the authentication being valid, for directing the behavior module to determine if the first event is a static event;
 g. responsive to the authentication not being valid, for directing the behavior module to secure the device;
 h. the behavior module, adapted to authorize an event, update rule data, and secure the device, the behavior module further for determining if an event is a static event, and responsive to the event not being a static event, for authorizing the event and updating the rule data;
 i. a processor; and
 j. a memory storing the behavior module and the authentication module for execution by the processor.

* * * * *